April 28, 1970  M. A. CHAVANNES  3,508,992
METHOD OF MAKING LAMINATED MATERIAL HAVING CELLS
BETWEEN THE LAYERS
Original Filed Dec. 26, 1963  6 Sheets-Sheet 1
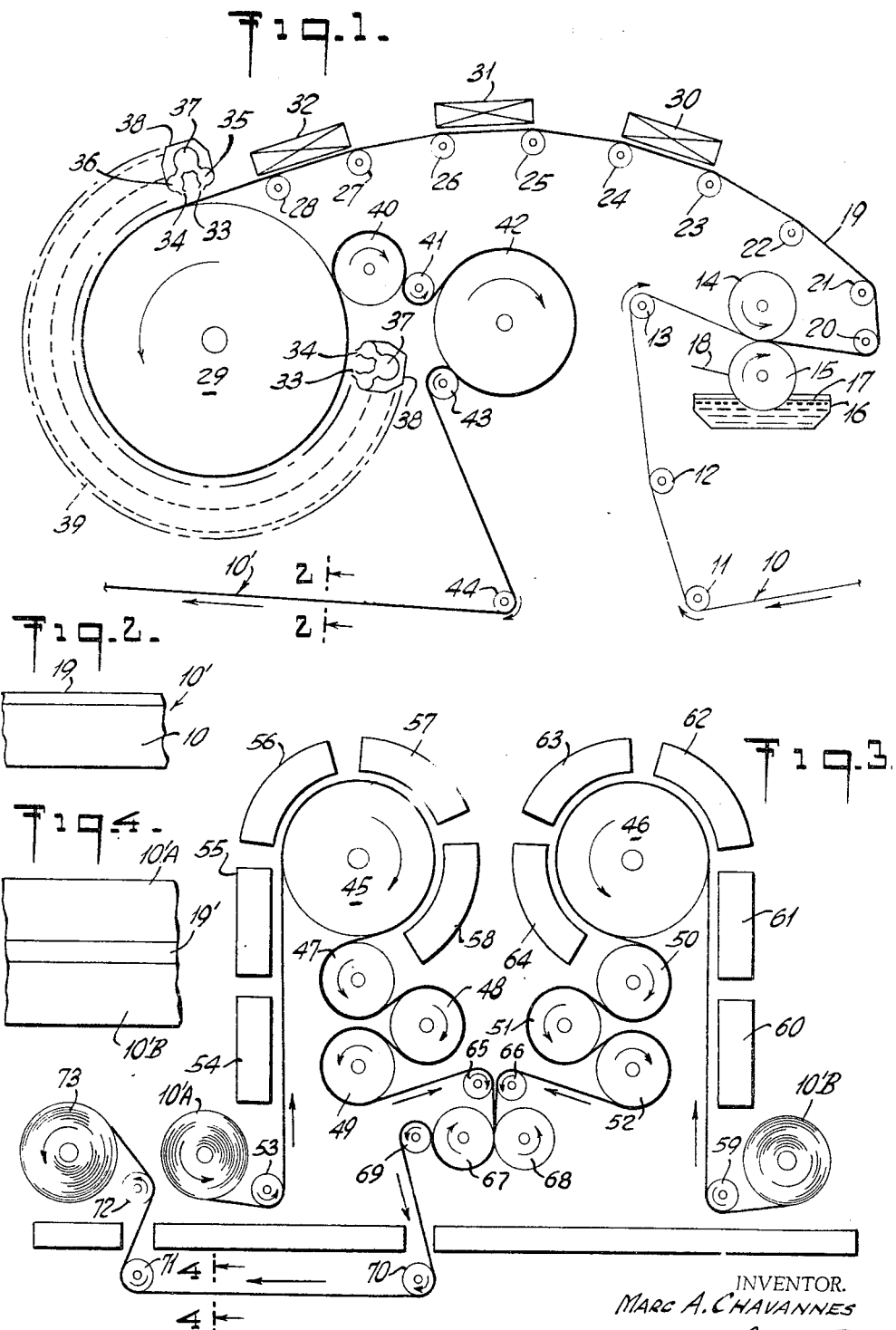
INVENTOR.
MARC A. CHAVANNES
BY
ATTORNEY April 28, 1970     M. A. CHAVANNES     3,508,992
METHOD OF MAKING LAMINATED MATERIAL HAVING CELLS
BETWEEN THE LAYERS
Original Filed Dec. 26, 1963     6 Sheets-Sheet 2

INVENTOR.
MARC A. CHAVANNES
BY
ATTORNEY

April 28, 1970   M. A. CHAVANNES   3,508,992
METHOD OF MAKING LAMINATED MATERIAL HAVING CELLS
BETWEEN THE LAYERS
Original Filed Dec. 26, 1963   6 Sheets-Sheet 3

INVENTOR.
MARC A. CHAVANNES
BY
ATTORNEY

April 28, 1970  M. A. CHAVANNES  3,508,992
METHOD OF MAKING LAMINATED MATERIAL HAVING CELLS
BETWEEN THE LAYERS
Original Filed Dec. 26, 1963  6 Sheets-Sheet 4

Fig. 9.

INVENTOR.
MARC A. CHAVANNES
BY
ATTORNEY

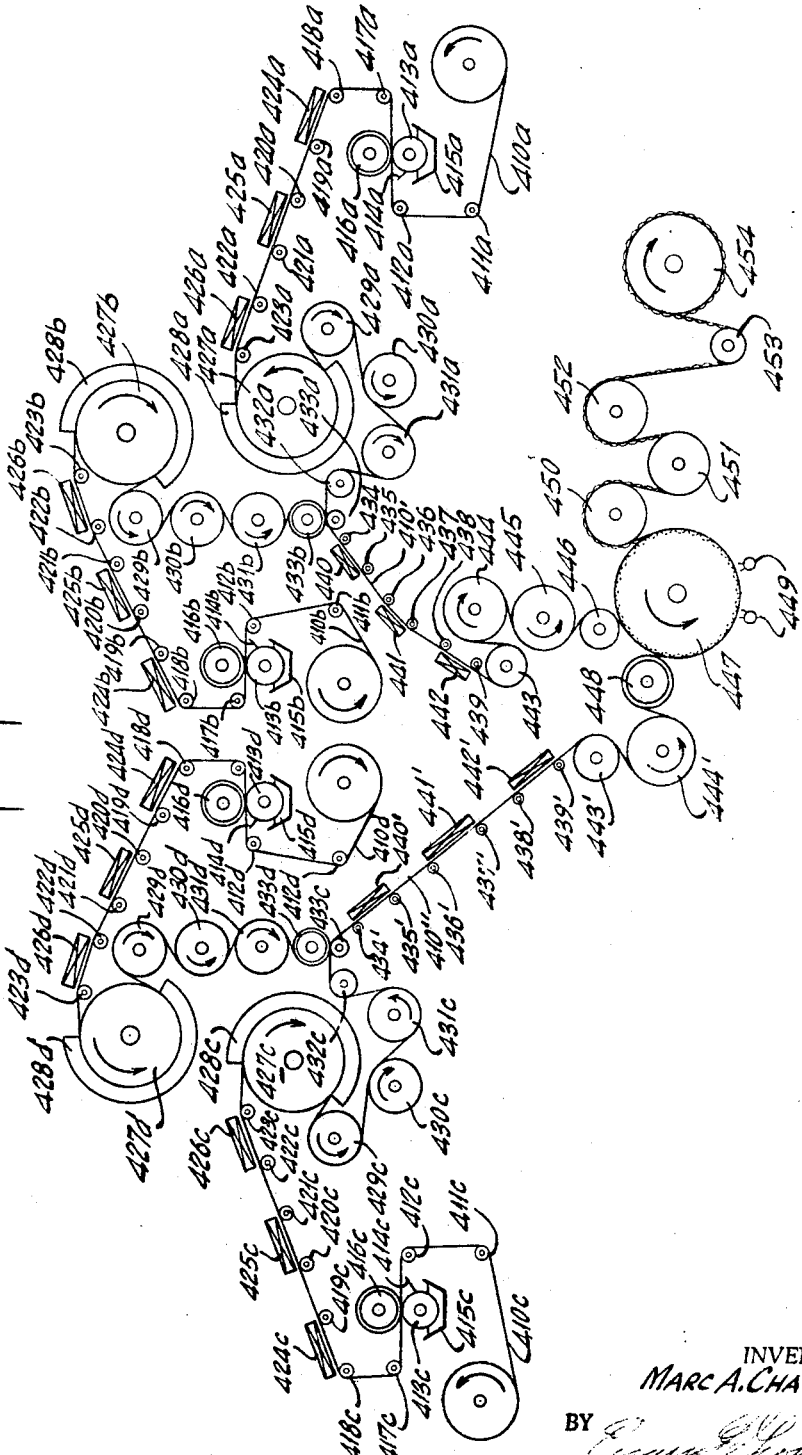

April 28, 1970   M. A. CHAVANNES   3,508,992
METHOD OF MAKING LAMINATED MATERIAL HAVING CELLS
BETWEEN THE LAYERS
Original Filed Dec. 26, 1963   6 Sheets-Sheet 6
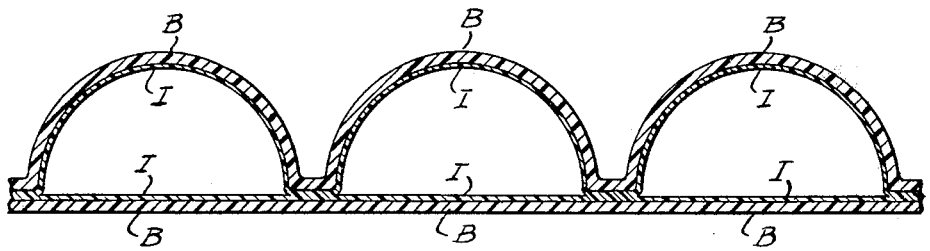
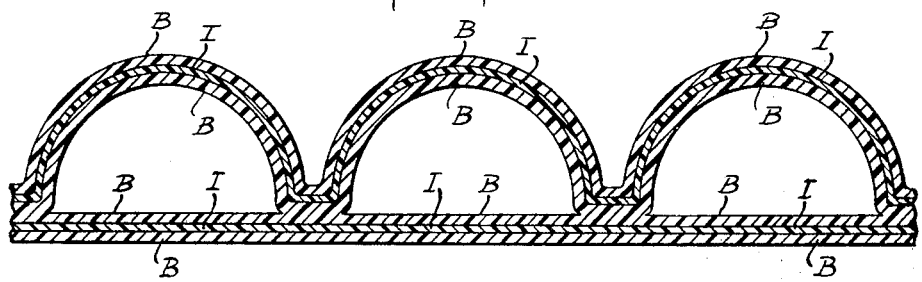
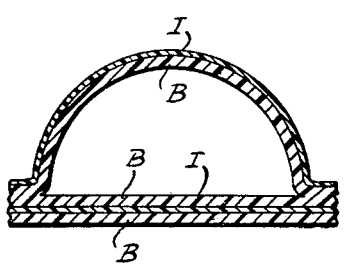 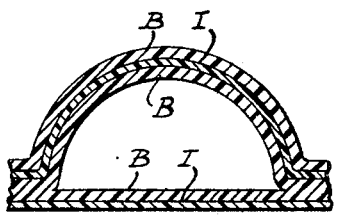
INVENTOR.
MARC A. CHAVANNES
BY
ATTORNEY United States Patent Office 3,508,992
Patented Apr. 28, 1970

3,508,992
METHOD OF MAKING LAMINATED MATERIAL HAVING CELLS BETWEEN THE LAYERS
Marc A. Chavannes, New York, N.Y., assignor to Sealed Air Corporation, Hawthorne, N.J., a corporation of New Jersey
Original application Dec. 26, 1963, Ser. No. 336,097, now Patent No. 3,405,020, dated Oct. 8, 1968. Divided and this application June 3, 1968, Ser. No. 733,965
Int. Cl. B32b 31/16
U.S. Cl. 156—209    8 Claims

ABSTRACT OF THE DISCLOSURE

An improved method for the manufacture of cellular material utilizing multi-ply laminates wherein at least one of the laminates is embossed prior to the sealing of the laminates one to the other, and cellular products wherein the cell walls are formed of laminated materials.

This application is a division of application Ser. No. 336,097, filed Dec. 26, 1963, now U.S. Patent No. 3,405,020, entitled "Method and Apparatus for the Manufacture of Plastic Laminates and Cellular Materials."

This invention relates to the lamination and molding of plastic materials and more specifically to a novel and improved method for laminating plastics and producing cellular materials therefrom.

While plastic materials, and particularly plastic materials in sheet form, are used in a great variety of applications, perhaps the largest use is for the packaging of materials since plastics generally offer numerous advantages over paper products. For instance, plastics generally will resist the deleterious effects of moisture and other liquids and gases that damage or destroy paper. The more common plastics used for packaging such as polyethylene and polyvinyl chloride are not entirely satisfactory because they are not entirely impervious to moisture vapor and gases. Certain of the more expensive plastics such as polyvinylidene chloride are substantially impervious to moisture vapor and other gases but are more costly and heavier in weight. The lamination of plastics such as polyethylene and polyvinyl chloride with the more impervious plastics such as polyvinylidene chloride has been suggested, but the cost involved in laminating sheets of these plastics makes their use for packaging purposes generally prohibitive and the resultant laminate is, of course, relatively thick and heavy.

One aspect of this invention concerns a novel and improved method for coating plastics such as polyethylene, polyvinyl chloride, polypropylene, nylon, cellulose acetate, polystyrene and others, with a very thin coating of a more impervious plastic such as polyvinylidene chloride, fluorocarbons, and the like, and forming cellular materials therefrom. With this invention, exceedingly thin coatings of plastic such as saran (polyvinylidene chloride) can be applied to some of the more inexpensive plastics to form a composite laminate that is relatively inexpensive and yet has such desirable properties as imperviousness to moisture and gases and light weight.

In cases wherein plastics having relatively low melting points are coated with saran having a higher melting point, the invention further contemplates a novel and improved method for sealing the saran coatings one to the other to provide laminates wherein the saran is contained between outer layers of another plastic and for the fabrication of cellular material wherein one of the sheets is embossed prior to the lamination. In both of these cases, the saran is fully protected against abrasion and at the same time is prevented from attacking and corroding certain metals and other materials. By having the saran contained wholly within the plastic product, whether it be an embossed or unembossed laminate, provides a relatively inert packaging material that is substantially impervious to gases and moisture vapor, has improved strength, and at the same time can be fabricated at relatively low cost.

A further object of the invention resides in the provision of a novel and improved method for fabricating cellular materials of laminated layers of plastic adhered one to the other with at least one of the layers having a plurality of embodiments therein forming discrete cells for cushioning and other purposes. The improved cellular material utilizing coated plastics in accordance with the invention provides a highly improved product that can withstand constant pressure for extended periods of time without the loss of the cushioning effect of the material.

A further object of the invention resides in the provision of a novel and improved cellular material fabricated of plastic laminates each having two or three layers of plastic material. In the case of the two layer laminate, either of the layers can be sealed to a corresponding layer of another laminate in the fabrication of a cellular material and other similar products.

A still further object of the invention resides in the provision of a novel and improved cellular material that is characterized by its increased imperviousness to gases and its relative inertness.

The above and other objects and advantages of the invention will become more apparent from the following description and accompanying drawings forming part of this application. In the drawings:

FIGURE 1 is a diagrammatic illustration of one embodiment of coating apparatus for producing the laminate in accordance with the invention;

FIGURE 2 is a greatly enlarged cross-sectional view of FIGURE 1 taken along the line 2—2 thereof and showing the resultant laminate.

FIGURE 3 is a diagrammatic illustration of modified coating and laminating apparatus in accordance with the invention;

FIGURE 4 is a cross-sectional view of FIGURE 3 taken along the line 4—4 thereof and showing a greatly enlarged cross-sectional view of the material in accordance with the invention;

FIGURE 9 is a diagrammatic view of still another embodiment of the invention for coating a plastic sheet and forming cellular material from the coated sheet;

FIGURE 10 is a diagrammatic view of an embodiment of the invention for forming three-ply laminates and then forming cellular material; and FIGURES 11 through 14 show various embodiments of cellular products in accordance with the invention.

Figure 5:
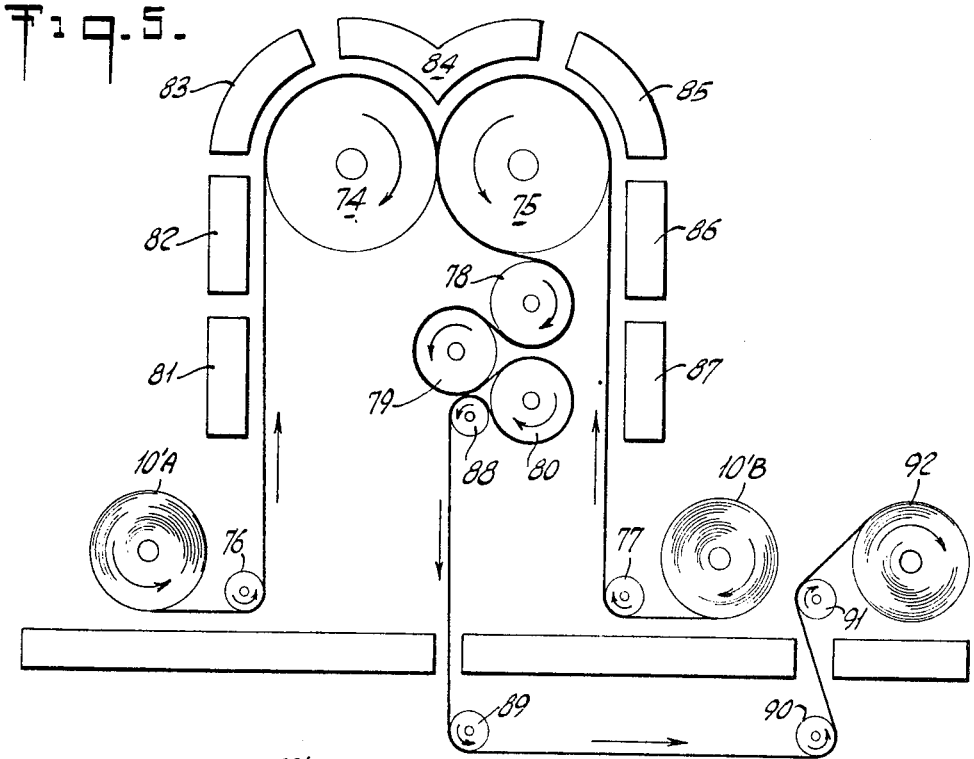
FIGURE 5 is a diagrammatic view of another embodiment of apparatus in accordance with the invention for producing a laminated plastic product.

As pointed out above, three factors have been found most significant when utilizing plastics for packaging and other similar purposes, namely, cost, imperviousness to gases, moisture vapor and the like, and mechanical strength. With cellular materials wherein a plastic layer is embossed and a second layer is sealed to the embossed layer to provide a plurality of air pockets, the utilization of substantially impervious plastics is of considerable importance to prevent the loss of cushioning effect when the material is under constant and sustained pressure.

This invention provides means for producing a relatively inexpensive plastic material that may be used in sheet form or may be processed to provide a cellular material and which affords benefits not heretofore attainable with known practices. For instance, with this invention, it is possible to provide plastic laminates wherein the base material may be in the order of one-half to several mils and even thicker, while the relatively impervious layer can be of the order of one-tenth of a mil though the thickness is not critical. In this way, the weight of the resultant laminate is maintained at a very low value. Since the impervious material, which is a costly product as compared with plastic such as polyethylene and polyvinyl chloride, is used in very small quantities, the resultant increase in cost is small. Furthermore, when utilizing the processes and apparatus in accordance with the invention, the lamination of the plastics can be carried out at speeds of the order of 1000 feet per minute with the result that processing costs are also minimized.

In the fabrication of cushioning material in accordance with the invention, it is possible to coat a plastic material with an impervious layer and immediately process the resultant laminate to provide a cellular material. In this way, intermediate handling of the laminated sheets is avoided, which further reduces the cost of the finished product. Furthermore, with the invention, a wide range of cellular materials can be produced utilizing double and triple laminates with any desired combinations of plastics, plastic coated papers, fabrics, and the like. Further, the invention provides for improved modes of sealing laminates in the fabrication of the cellular material.

Reference is now made to FIGURE 1, illustrating one embodiment of the invention for coating plastic sheeting. In producing the laminate in accordance with the invention, a base material, such as polyethylene, is in sheet form and is fed continuously through laminating apparatus. The polyethylene is denoted by the numeral 10 and enters the apparatus from the right side. It is guided by a series of rollers 11, 12, and 13 to a pair of rollers 14 and 15 which apply a coating of another plastic to one side thereof. The coating on film 10 may be an emulsion, dispersion or solution 17 and is contained within a suitable trough 16. The roller 15, in the form of a rotogravure printing roll, is at least partially immersed in the liquid 17 and becomes coated as it is rotated. A doctor blade 18 engages the surface of the roller 15 and removes excess liquid that may adhere thereto. When the roller 15 contacts the film 10, the latex liquid or solution 17 is printed on the film and denoted by the numeral 19. The roller 14 acts as a backing roller for the roller 15 to insure uniform deposition of the layer 19 on the film. The printed film is then carried about a series of rollers 20 through 28 which are disposed in arcuate configuration and guide the coated film onto a relatively large cylinder or drum 29 on which the coated layer of plastic is dried and cured. This improved coating process enables the application of exceedingly thin, uniform layers at very high speeds.

The apparatus shown in FIGURE 1 is particularly applicable for use in applying a coating of polyvinylidene chloride to the base film 10, and the thickness of the coating so applied is governed by the depth of the depressions in the printing roller 15. By making the depressions in the printing roller 15 relatively shallow, it is possible to surface the base film 10 with a layer of polyvinylidene chloride having a thickness of the order of .0001". The coating liquid may, of course, take a variety of forms though a particularly good one is a latex in which approximately 90% by weight of polyvinylidene chloride and 10% by weight of acrylonitrile have been copolymerized together. This produces an elastic coating that may be readily embossed. The particle size of the material should preferably not exceed .25 micron, and the mixture is then combined with an emulsifying agent and water to provide a latex having a suitable viscosity for application to the base film by means of a printing roller as described above. While it would be possible to use an appropriate solvent in place of the water and emulsifying agent for the production of the liquid latex, it is important that the solvent does not attack or penetrate the base material, for under such circumstances the base material would tend to absorb the solvent and it would then be difficult and time-consuming to remove it from the base material. In cases where the base material will not absorb the solvent, a solution of the plastic may be utilized in place of the latex.

As the film 10 with the latex coating 19 on the surface thereof passes over the rollers 20 through 28 which are preferably driven at a uniform speed, the individual islands of the latex material deposited by the printing roller 15 spread on the surface of the base material and produce a uniform coating. Initial heating of the film is accomplished by heat radiators 30, 31 and 32 which preheat the supporting film and the deposited layer to a temperature substantially below that of the melting point of the supporting layer.

The drum 29 about which the coated material 10 is fed is preferably maintained at a temperature high enough to prevent excessive loss of heat from the laminate and yet not melt the supporting layer. The layer 19 is cured and dried while passing around the drum 29 by means of a plurality of air jets 33 and 34. The air jets 33 are in the form of a plurality of closely spaced orifices formed in a transverse tube 35, while the jets 34 constitute a plurality of orifices in an adjoining laterally disposed tube 36. The tubes 35 and 36 are connected to a central manifold 37 and each pair of tubes 35 and 36 together with the common manifold 37 are housed in a surrounding shield 38. Hot air is fed to the plurality of manifolds 37 by a primary manifold 39 shown in dotted outline. With this arrangement, jets of hot air impinge on the layer 19 as the material passes about the drum 29.

When utilizing a polyvinylidene chloride emulsion, the temperature of the air exhausted by the jets 33 and 34 should preferably be of the order of 300° F. to 400° F. This raises the temperature of the polyvinylidene coating and at the same time the drum 29 maintains the base material below the melting point of that material. Using polyethylene as the base material, it has been found that with a drum having a diameter of about 54 inches and with the base material traveling at a speed of approximately 1000 feet per minute, the infra-red heaters 30 through 32 should emit sufficient heat to raise the temperature of the latex coating to a valve not exceeding 175.° F. Air temperatures of 300° to 400° will then completely dry and cure the coating. With higher melting point base materials, higher preheating temperatures can be used.

After the material emerges from beneath the last of the air jets, it is removed from the drum 29 by a series of driven rollers 40 through 44 with the rollers 40 and 42 being cooled to bring the composite film or laminate 10' to room temperature.

The completed laminate 10' is shown in FIGURE 2 and it will be observed in this greately enlarged cross-sectoinal view that the layer 19 is very thin as compared to the base material 10.

Figure 7:
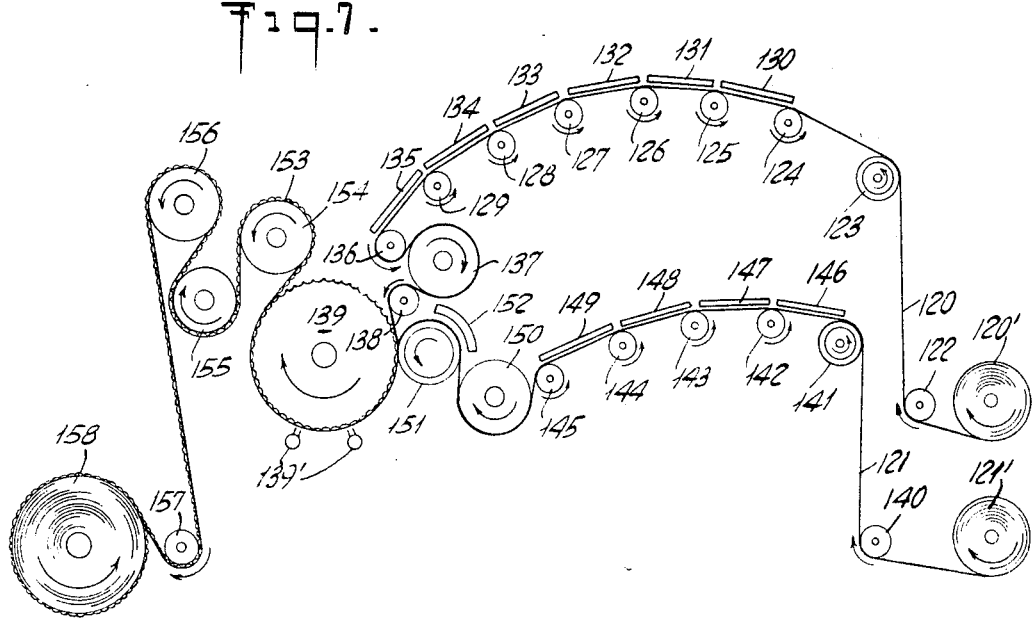
FIGURE 7 is a diagrammatic illustration of apparatus for embossing laminated plastics to form cellular materials and wherein the joinder of the laminates is effected by heating both laminates so that they will be at a fusion temperature at the point of lamination.
Figure 8:
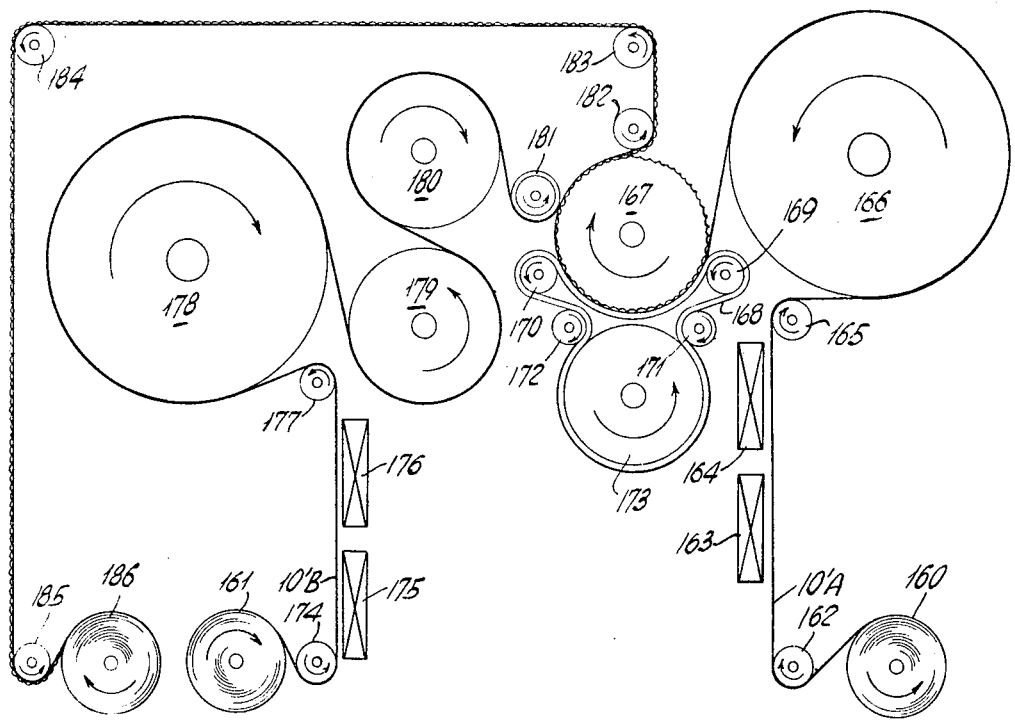
FIGURE 8 is a diagrammatic illustration of another embodiment of the invention for manufacturing cellular material and wherein the fusion of the two laminates is effected by a cooling process.

The film 10' produced in accordance with the method and apparatus shown in FIGURE 1 may be utilized to produce a three layer film with the central layer being impervious to gas and moisture vapor, while the outer layers may be heat sealable at relatively low temperatures. For this purpose, the film 10' can be made of a relatively thin base layer 10, as, for instance, .001 inches in thickness and the latex layer 19 may be of the order of .0001 of the thickness of the base layer. The completed material 10′ may be rolled on a spool with the impervious layer facing inwardly or fed directly to apparatus for fabricating cellular material such as shown in FIGURES 7 and 8.

In accordance with the apparatus and method shown in FIGURE 3, two sheets of the film 10′ are joined to form the triple layer material. More specifically, the structure of FIGURE 3 comprises a pair of drums 45 and 46 which are preferably maintained at a temperature materially below the melting point of the heat sealable base layer of the composite sheets being joined. In the case of polyethylene, the temperature should preferably not exceed 180° F. Below the drum 45 there is a series of three driven rollers 47, 48 and 49 over which one film is fed. A similar set of rollers 50, 51 and 52 are disposed below the drum 46.

Film from a first roll 10′A is fed over a guiding roller 53, thence upwardly about the drum 45 and about the rollers 47 through 49. A series of radiant heaters 54 through 58 are positioned adjacent the path of the film from the roll 10′A and about the drum 45 to preheat the supporting film and the impervious layer, such as polyvinylidene chloride, to a temperature not exceeding 175° F. It has been found that heaters radiating infrared wavelengths in the approximate range of 3.2 to 3.5 microns produce good results.

Coated film from a second roll 10′B is fed about the guiding roller 59 and thence upwardly about the drum 46 and the rollers 50 through 52. A similar set of radiant heaters 60 through 64 are disposed along the path of the film from the roll 10′B and about the drum 46 to heat the supporting film and the polyvinylidene layer in the same manner as described in connection with the film from the roll 10′A. The rollers 47 through 49 and 50 through 52 are preferably cooled to bring the temperature of the polyvinylidene layer to approximately 60° F. after having been heated by the infrared heaters. This causes the polyvinylidene to become amorphous and this state will continue for hours.

The treated films 10′A and 10′B are then directed over rollers 65 and 66 and are brought together between pressure rollers 67 and 68 with the polyvinylidene coatings in contact one with the other. In so doing, two layers will firmly and permanently cohere one to the other so that the polyvinylidene coatings will join to form in effect a single central layer. The film is then carried by rollers 69, 70, 71 and 72 to a spool 73 on which the completed film is wound. A fragmentary cross-sectional view of the completed film is shown in FIGURE 4 and it will be observed that the vinylidene layer 10′ is substantially homogeneous and is relatively thin as compared with the surface layers of heat sealable plastic 10A and 10B. When using base films of the order of one-half mil in thickness, the total thickness of the composite laminate will be only slightly greater than one mil.

The laminate produced in accordance with the method and the structure of FIGURE 3 can be accomplished at exceedingly high rates of speed of the order of 1,000 feet per minute and it is evident that it may be combined with a device such as shown in FIGURE 1 for continuously producing the three-ply laminated plastic without the need for handling the coated base material between the steps of the process.

Modified apparatus and method for producing the three-ply laminate from two coated films is shown in FIGURE 5. In this embodiment of the invention, two drums 74 and 75 corresponding to drums 45 and 46 of FIGURE 3 are placed in adjoining relationship and spaced apart a distance slightly less than the total distance of the two films 10′A and 10′B to be joined one to the other. In this way, the two films are placed under pressure to effect the joinder. The individual films 10′A and 10′B are passed about rollers 76 and 77, respectively, thence upwardly about the drums 74 and 75 and the joined film is then passed about cooling rollers 78, 79 and 80. The two films 10′A and 10′B are preferably fed onto and about the drums 74 and 75 with the polyvinylidene coating on the outer sides. The coatings and the supporting film are heated by infrared heaters 81 through 87 to raise the temperature of at least the coatings to about 250° F. to 275° F. When the polyvinylidene coatings on the films are brought together in this heated state, they will adhere, and the rollers 78 through 80 are cooled to immediately lower the temperature of the film preferably below 100° F. The completed film then passes over rollers 88, 89, 90 and 91 and is wound on a spool 92.

In certain instances, it is desirable to utilize a primer on the base material in order to produce better adhesion between the impervious coating and the base material, as, for, instance, an epoxy or a resin having a butadiene base such as the combination of polyvinyl chloride and butadiene. In most applications, it is desirable to use a water dispersion of the resin though it is possible to utilize a solution provided, however, that the solvent will not attack the base material as previously described.

Figure 6:
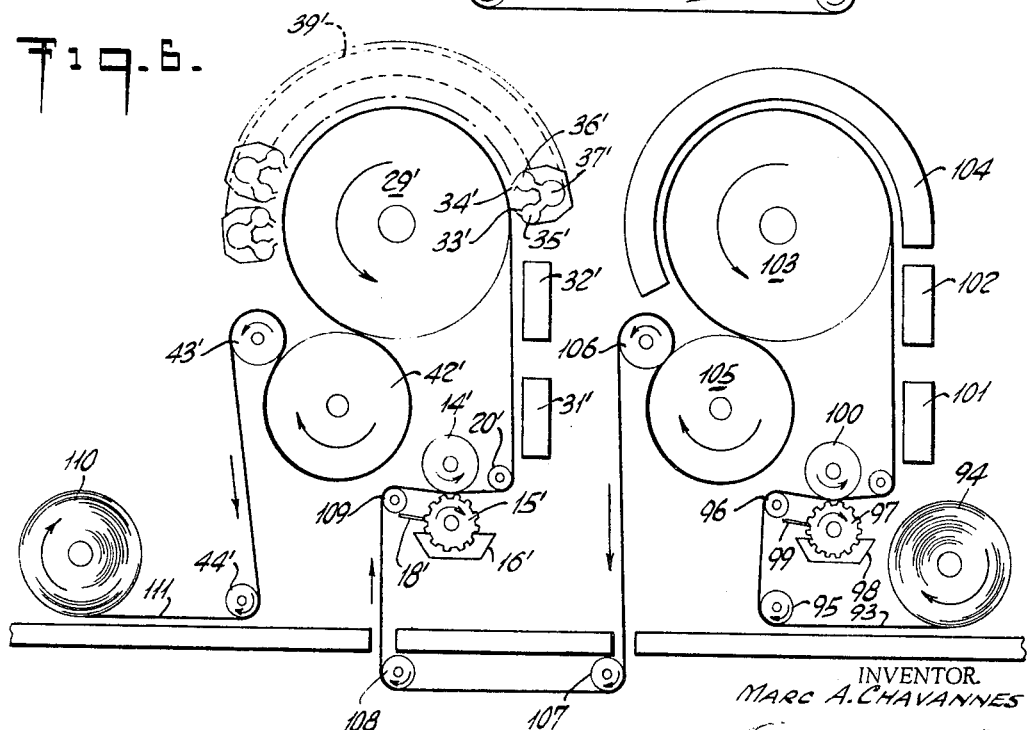
FIGURE 6 is a diagrammatic view of still another embodiment of apparatus in accordance with the invention.

The lamination of plastics utilizing a primer is shown in FIGURE 6 where the base material is denoted by the numeral 93. It is fed from a roll 94 about rollers 95 and 96 to a suitable printing roll 97. The printing roll 97 has a portion of its periphery immersed in a bath 98 containing the primer, and the amount of primer adhered to the roll is controlled by the doctor blade 99 and the depth of the depressions in the printing roller. A backup or pressure roller 100 cooperates with the printing roller 97 so that some pressure is applied to the film to insure uniform application of the primer to the base material 93. After the base material 93 has been coated, it passes upwardly past radiant heaters 101 and 102 and thence about a drum 103. It is preferable to maintain the drum 103 below the melting point of the base material 93 as described in connection with the previous embodiments of the invention. The structure 104 surrounding a portion of the periphery of the drum 103 is identical to the structure surrounding the drum 29 shown in FIGURE 1 and provides a plurality of air jets for the direction of heated air onto the coating.

While any suitable primer may be used, an example of a satisfactory primer is a polyvinylidene dispersion containing a partially polymerized resin and about 40% solids such as colloidal silica. After the primer coating has been heated and cooled in substantially the same manner as the polyvinylidene latex coating previously described, the film passes over rollers 106 to 109 for a coating of polyvinylidene latex as described in FIGURE 1.

The application of the coating of polyvinylidene and its curing is accomplished in a manner identical to that illustrated and described in connection with FIGURE 1, and, accordingly, like primed numerals have been utilized to identify corresponding elements of FIGURES 1 and 6. For instance, the polyvinylidene is applied by the printing roller 15′ in cooperation with the backing roller 14′, it then passes about the roller 20′ and then upwardly past radiant heaters 31′ and 32′ and about the roller 29′ during which period hot air from jets 33′ and 34′ impinge on the layer to effect the cure. The heated material is then taken off the drum 29′ and moves about the cooling drum 42′ and thence about the rollers 43′ and 44′ to the spool 110.

The resultant material 111 containing a suitable base sheet with successive coats of a priming resin and an impervious resin such as polyvinylidene may then be utilized in that form for packaging or other applications or two such laminates 111 may be joined to produce a composite structure by means of the methods and apparatus illustrated and described in connection with FIGURES 3 and 5.

From the foregoing, it is evidence that this improved material can be manufactured at exceedingly high rates of speed and that relatively small amounts of the impervious resin are required in order to produce a more effective sheet material and at the same time having substantial strength and heat sealable characteristics. The utilization of relatively small amounts of impervious resin such as polyvinylidene adds very little to the resultant cost of the sheet material, and actual practice has indicated that the great advantages obtained more than outweigh the small additional cost.

The improved laminates, as described above, are relatively light in weight and substantially impervious to gases and moisture vapor. These laminates are particularly useful for the manufacture of cellular material as described in U.S. patent application, Ser. No. 855,712, filed Nov. 27, 1959 now U.S. Patent No. 3,142,599, entitled Method and Apparatus for Making Laminated Cushioning Materterial, wherein at least one of the sheets being laminated is embossed with a plurality of discrete embossments and embossments are in turn sealed by a backing sheet.

The apparatus shown in FIGURE 7 is particularly useful for the formation of cellular materials with laminates described above wherein the layers having the lower melting points are to be sealed one to the other. This would, of course, include the sealing of two three-ply laminates such as shown in FIGURE 4, two two-ply laminates or combinations of two and three-ply laminates. This form of the invention may also be used with polyvinyl chloride coated with saran and wherein the saran surfaces of the laminates are sealed one to the other. While the structure of FIGURE 7 has been illustrated as a separate piece of equipment, it is evident that it can be combined with a suitable form of coating or laminating equipment such as shown in FIGURES 1, 3, 5 and 6 so that the plastic sheets are each coated and then automatically fed to the apparatus for forming the cellular material, thus avoiding the handling of the intermediate product. Furthermore, by reason of the improved lamination procedures as shown in the preceding figures, the speed of the laminating process can be controlled and coordinated with the speed of the apparatus for forming the cellular material.

Referring now specifically to FIGURE 7, the laminated sheets of plastic to be formed into cellular material are denoted by the numerals 120 and 121. For present purposes, the supply of such plastic sheeting is shown in the form rolls 120' and 121', respectively. The plastic sheet from the roll 120' is fed over a roller 122 and thence over a series of rollers 123 through 129 which are preferably positively driven rollers to avoid any unnecessary stresses on the sheet as it is being heated.

A plurality of radiant heaters 130 through 135 are positioned generally between each pair of rollers 123 through 129 and serve to gradually raise the temperature of the sheet 120. The rollers 123 through 129 are all preferably covered with a high, heat-resistant, non-conductive material, such as Teflon, and the like, to prevent any possible adherence of the plastic sheet 120 to the rollers. The temperature of the heaters 130 through 135 is also adjusted in accordance with the melting point of plastic material 120. In the case of polyethylene, for instance, the temperature of the material 120 at the time it arrives at the terminal roller 136 should be in the neighborhood of 180° to 200° which is materially below the melting point of polyethylene. In the case of saran and polyvinyl chloride, the temperature would be somewhat higher since the melting points of these plastics are higher.

The plastic sheet 120 then passes around the roller 136 and the rollers 137 and 138, all of which are also preferably coated with a material that will inhibit adherence of the heated plastic thereto. For this purpose, Teflon has been found very effective. The three rollers 136 through 138 are all heated, preferably at gradually increasing temperatures, so that the temperature of the plastic sheet 120 at the time it is applied to the embossing roller 139 is at a temperature wherein the outer surface when on the embossing roller 139 is preferably near the melting point. It has been found desirable to avoid bringing the plastic material 120 to a temperature at or above its melting point particularly in cases where unlaminated sheets are used, since it has been found that the vacuum embossing roller 139 may produce very fine holes in the plastic if the temperature at the moment it is applied to the embossing cylinder is too high. Notwithstanding the lower temperatures of the film 120 as it is applied to the vacuum embossing roller 139, fusion of the embossed layer 120 with the backing layer 121 is effected in a manner to be described.

The embossing cylinder 139 may have any desired size or configuration, it being desirable, however, that the surface contain the plurality of discrete depressions of a size and configuration of the embossments to be formed in the layer 120, be fabricated of a heat conductive material, such as aluminum or the like. In addition, the roller includes means for maintaining its temperature at a predetermined level throughout the process which is below the melting point of the plastic layer in contact with the cylinder.

The backing plastic sheet 121 is fed from a suitable supply such as a roll of the film 121' and is fed about the roller 140 and the Teflon coated rollers 141 through 145, each of which is positively driven. A pluraltiy of radiant heaters 146 through 149, which may be infrared heaters or other suitable heating units, raise the temperature of the plastic layer to a temperature somewhat below the melting point thereof. The layer 121 is then fed about a Teflon coated heating roller 150 and thence about a silicon coated roller 151. The roller 151 is preferably maintained at or below room temperature and functions to maintain the back side of the film 121 substantially below its melting point. At the same time, a radiant heater 152, curved about the surface of the roller 151, heats the outer surface of the film 121 to a temperature substantially above the sealing temperature of the surface of that layer. For example, let it be assumed that the plastic layers to be sealed one to the other with the apparatus shown in FIGURE 7 have a sealing temperature of about 305° F. Under these conditions, the sheet of plastic 120 is preferably heated to a temperature of approximately 300° F. for application to the embossing cylinder. This temperature is below the sealing temperature which prevents the possibility of damage to the film during the embossing procedure. At the same time, the film or sheet 121 has its outer surface heated to a temperature at or above 310° F. so that the surface of the film may be in a melted condition or very near the melting point. The film 121, however, will not be distorted or damaged since the roller 151 maintains the back side of the film at a temperature well below its sealing point. Under these conditions, the heated surface of the film 121 is sufficient to momentarily raise the temperature of the outer surface of the film 120 when on the embossing roller so that the contacting surface of the two films are at or above the fusing temperature and are permanently fused together with the embossed portions of the film 120 being individually sealed.

Another factor of importance in effecting a good seal between the two films 120 and 121 resides in the control of the temperature of the embossing roller 139, it has been found that the optimum temperature for the roller 139 will vary in accordance with the speed of the operation and the thickness of the films. Normally, when using 1 mil films of polyethylene, the temperature of the roller 139 can be as high as 180° when the machine is first operated. As the temperatures stabilize in the machine, and when running at a speed of the order of 200 feet per minute, the temperature can be materially reduced to the order of 100° and even lower. At higher speeds, still lower temperatures can be maintained in the roller 139, and, of course, with heavier films lower temperatures can be maintained readily. It is desirable to maintain as low a temperature of the roller 139 as possible without adversely affecting the seal between the two films as it is desirable to effect some cooling of the embossments while on the embossing cylinder and avoid the accumulation of heat in the cylinder which can result in damage to the embossments.

The completed cellular material denoted by the numeral 153 may be cooled by suitable water or air jets 139' and is removed from the cylinder 139 by a series of cooling rollers 154, 155 and 156 which further lower the temperature of the completed product whereupon it is fed about the roller 157 and on to a suitable spool 158.

The apparatus shown in FIGURE 7 is particularly useful in forming cellular material from laminates such as those shown in FIGURES 10, 11 and 12 wherein the impervious material is generally denoted in each figure by the letter I while the base material is denoted by the letter B and wherein the base material B normally has a lower melting point that the impervious material I. Even in cases where the melting point of the base material may be slightly higher than the material I, it is possible to utilize the equipment shown in FIGURE 7 since the temperature of the layer 120 upon application to the embossing cylinder 139 is generally slightly lower than the melting point of the layer of material to be sealed, while the sheet 121 upon passing over the roller 151 is cooled on the back side and heated by a heater 152 on the outer side so that at least the surface of the outer layer which is sealed to the embossed sheet 120 will have a temperature preferably slightly above its melting point as described above.

In the fabrication of cellular material such as that shown in FIGURE 11 wherein the impervious layer I melts at a higher temperature than the base layer B and has an amorphous state, an improved mode of sealing the two layers one to the other may be utilized. This improved method and apparatus will now be described in connection with the apparatus shown in FIGURE 8 of the drawings. In this figure the laminated layers to be sealed one to the other are denoted by the numerals 10'A and 10'B, these laminated sheets being formed, for instance, as described in connection with FIGURE 1. For convenience in description, the laminated sheets are fed from rolls 160 and 161 with the sheet 10'A being fed about a roller 162 and then upwardly past radiant heaters 163 and 164 and thence about a roller 165 and a large drum 166. Assuming that each of the laminates 10'A and 10'B comprise a base layer of polyethylene and a surface coating of saran, the saran would then be on the left-hand face of the material 10'A as shown in FIGURE 8 and on the right side of the material 10'B. Thus, the radiant heaters 163 and 164 will principally heat the saran to a temperature in the neighborhood of 180° F. to 200° F. The cylinder 166 is heated to a temperature high enough to bring the saran coating to a tempeature of the order of 215° F. to 225° F. The heated material is then applied to the embossing cylinder 167 which is heated in a manner heretofore described. The embossing cylinder 167 is substantially identical to the cylinder 139 shown and described in FIGURE 7 and the embossed layer 10'A is then cooled by a cooling belt 168 which tightly engages the surface of the embossing cylinder 167 and is carried by rollers 169, 170, 171, 172 and 173, the latter being maintained at a temperature low enough to bring the saran coating down to and preferably below room temperature and thus place the saran in an amorphous state.

The second layer 10'B, which is to be sealed to the outside of the embossed layer 10'A while on the embossing cylinder 167, is carried by the roller 174 upwardly past radiant heaters 175 and 176 and then about a series of rollers 177, 178, 179 and 180. Since the saran layer on the sheet 10'B is on the right-hand side as viewed in FIGURE 8, the heaters 175 and 176 will heat the saran coating to the order of 200° F. as in the case of heaters 163 and 164. The roller or cylinder 178 is heated at a sufficiently high temperature to again raise the temperature of the saran to about 215° F. to 225° F. The roller 178, as well as the roller 166, is preferably coated with Teflon to prevent any possible adherence of the layers to these heating rollers. The heated material 10'B leaving the roller 178 moves about the rollers 179 and 180 which reduces the temperatures of the saran layer to the vicinity of room temperature and preferably lower, and the cooled material which is now in the amorphous state is fed about the roller 181 and onto the embossed and cooled layer 10'A. Since both the saran coatings are in the amorphous state, a permanent seal is effected upon contact of the two layers and the finished material is then removed from the embossing cylinder by a series of rollers 182, 183, 184 and 185 wound on a suitable spool 186.

The material fabricated by the method and apparatus illustrated in FIGURE 8 is shown in FIGURE 11 and it will be observed that the impervious layers I, which in the present illustration represent saran, are completely enclosed by the base layers such as polyethylene, polyvinyl or the like.

As previously pointed out, certain forms of apparatus may be used in a single continuous process for the fabrication of a plastic laminate and then forming the laminates immediately thereafter into cellular material. For instance, the method and apparatus of FIGURE 1 may be utilized with the method and apparatus set forth in FIGURE 7 as a single procedure for the continuous fabrication of cellular material. In so doing, it is possible to eliminate certain of the heating and cooling steps and thereby provide a more efficient process.

One form of apparatus for laminating plastic sheets in accordance with the invention and then immediately forming cellular material is illustrated in FIGURE 9. Inasmuch as certain elements of FIGURE 9 correspond to elements of FIGURES 1 and 7, like numerals with the addition of "200" have been used to denote such elements in FIGURE 9. For instance, the printing roller 15 of FIGURE 1 is denoted in FIGURE 9 as 215, and the embossing roller 139 of FIGURE 7 is denoted by the numeral 339.

The apparatus of FIGURE 9 may be utilized for fabricating a wide variety of laminates and particularly the coating of films or sheets of polyethylene and polyvinyl chloride with an impervious plastic such as saran. As will become evident, the saran coatings may either be heat sealed to join two coated plastic sheets in the formation of cellular material or the joining may be effected by transforming the saran coatings to an amorphous state. In the foregoing description of other embodiments of the invention, the temperature and heat treatment to effect joindner of plastic laminates were discussed and the same principles apply in the case of the apparatus of FIGURE 9.

The plastic sheets to be coated are denoted by the numerals 210a and 210b and are simultaneously treated. The sheet 210a is passed over rollers 211 and 212 thence between a printing roller 215 and a cooperating pressure roller 214. The printing roller 215 is immersed in a bath 216 which may be a saran emulsion and a doctor blade 218 removes excess emulsion on the surface of the roller 215. The printed sheet 210 then passes about rollers 220 through 228 and beneath radiant heaters 230 to 232. The dried laminate then moves about the cylinder 229 and the coating is further dried by hot air jets contained within the housing 239 as previously described in connection with FIGURE 1. The laminate, upon leaving the cylinder 229, while in a heated condition, is below the fusion point of saran. In order to raise the laminate to a suitable molding and fusing temperature, the film passes over rollers 336, 337 and 338 which may be heated at successively increasing temperatures whereupon it is fed onto the vacuum embossing cylinder 339.

The second film 210b is processed in substantially the same manner as the film 210a and elements for processing the film 210b are identified by corresponding primed numerals. After the film 210b leaves the drum 229', it passes about three heating rollers 336', 337' and 338' and thence about a cooled roller 351 having a resilient coating 351a preferably of silicone rubber or the like to provide substantially uniform nip pressure throughout its contact with the embossing cylinder 339. A final heater 352 surrounding a portion of the periphery of the roller 351 heats the outer surface of the film 210b above the fusion temperature to effect a seal with the embossed material 210a and provide a plurality of sealed cells. The temperature of the cylinder 339 is preferably controlled at a level below the embossing temperature of the film 210a. At relatively high speeds, the temperature of cylinder 339 can be reduced to the order to 100° F. and even lower. In addition, cooling jets of water or gas 339' may be employed to insure sufficient cooling of the laminated material and a permanent bond between the two coated films or sheets. The finished material is then passed about cooling rollers 354, 355 and 356 and is thereupon guided about a roller 357 onto a spool 358. The finished material will then correspond to the product shown in FIGURE 11 though the embossments may take configurations other than hemispherical.

The apparatus shown in FIGURE 9 may also be utilized with a modified procedure for sealing coated plastic sheets 210a and 210b when the coating applied to the sheets has an amorphous state such as in the case of saran. This modified procedure involves heating at least the saran coatings to a temperature of the order of 215° F. and then rapidly cooling the coatings to a temperature well below room temperature and preferably of the order of 40° F. to 60° F. The cooling of the film 210a may be effected by the utilization of an appropriate cooling belt such as the belt 168 shown in FIGURE 8 which would function to cool the embossed film 210a while on the embossing cylinder 339. The film 210b would then be supercooled by means of rollers 336', 337', and 338' and the roller 351 would merely function to bring the film 210b into pressure contact with the film 210a on the embossing cylinder 339. With this arrangement, the rollers 354, 355 and 356 would not have to be cooled but could be maintained at room temperature.

The apparatus shown in FIGURE 10 illustrates a continuous process for simultaneously coating four separate plastic sheets with a plastic material containing saran or the like, laminating pairs of sheets to provide a three-ply material as described in connection with FIGURE 3 and then forming a cellular material from the two laminates to provide a finished product substantially as shown for instance in FIGURE 12 of the drawings.

More specifically, the four films which are simultaneously processes are denoted by the numerals 410a, 410b, 410c and 410d. The film 410a is carried about rollers 411a and 412a to a printing roller 413a having a doctor blade 414a. The printing roller 413a is partially immersed in a bath 415a containing a latex such as the combination of polyvinylidene and acrylonitrile as previously described. A pressure roller 416a cooperates with the printing roller 413a to print the latex onto the film 410a. The coated film then passes over rollers 417a through 423a, and radiant heaters 424a, 425a and 426a function to remove some of the moisture from the coating as described in connection with FIGURE 1. The film then passes about a drum 427a having an air jet structure 428a which corresponds to the structure 39 described in connection with FIGURE 1. This finally dries the coating and the coated plastic film 410a is then removed from the drum 427a by heated rollers 429a, 430a, 431a and 432a.

The films 410b, c and d are simultaneously processed with the film 410a in the same manner and corresponding elements of the processing equipment for these three films are identified by corresponding numerals carrying the suffixes b, c and d, respectively.

The coated films 410a and 410b are brought together with the coatings heated to a fusion temperature and pass between the nip of the rollers 433a and 433b, the latter preferably having a resilient coating thereon of silicone rubber or the like. This produces a three-ply laminate substantially as shown in FIGURE 4 of the drawings and is denoted in FIGURE 10 by the numeral 410'. The laminate is then guided over rollers 434 through 439 and beneath resilient heaters 440, 441 and 442 to preheat the laminate 410'. The laminate then passes about heating rollers 443, 444, 445 and 446 and thence onto the embossing cylinder 447.

A second three-ply laminate 410'' is formed from the coated films 410c and 410d in like manner and the elements of the apparatus for effecting this lamination correspond to the elements of the apparatus for laminating films 410a and 410b and are identified by like primed numerals with the exception that the rollers 445 and 446 for heating the laminate 410' are replaced by a single resiliently coated roller 448 to provide a uniform pressure with the embossing cylinder 447 so that an effective seal between the two laminates will be obtained. The coating on the roller 448 is preferably of silicone rubber or the like as in the case of the roller 151 of FIGURE 7. The laminated cellular structure on the embossing cylinder 447 is then cooled by jets of cold air or water 449 and the cooled material is then removed by cooling rollers 450, 451 and 452. The material is then guided about a roller 453 and wound upon the spool 454.

The apparatus in FIGURE 10 can be modified to laminate the coated plastic sheets 410a and b and 410c and d by utilization of the supercooling process. For this purpose the rollers 429a, 430a and 431a would be supercooled in order to rapidly cool the coating to bring it to an amorphous state. The rollers 429b, 430b and 431b would be similarly supercooled in order to cool the coating on the sheet 410b. When the supercooled coated sheets are brought together between the rollers 433a and 433b, they will immediately cohere to form the three-ply laminate. Thereafter, the process for heating and embossing the three-ply laminate 410' is as described above. The same procedure would be adopted in the lamination of the coated sheets 410c and 410d by cooling the rollers 429c, 430c, 431c, 429d, 430d and 431d.

From the foregoing, it is evident that combinations of the apparatus may, of course, be utilized depending on the desired structure of the resultant product. For instance, it would be possible by a continuous process to coat plastic sheets and form a three-ply laminate and then combine the three-ply laminate with a two-ply laminate to form the cellular material in accordance with the invention.

The improved products in accordance with the invention are illustrated in FIGURES 11 through 14 and in each case, the base materials have been denoted by the letter B while the material coated thereon is denoted by the letter I. In FIGURE 11, two-ply laminates have been used with the impervious material I being enclosed and protected by the base material. The base material may, of course, be any suitable material such as polyvinyl chloride, polystyrene or the like, while the impervious material may comprise a combination of polyvinylidene chloride and acrylonitrile though other suitable plastics for attaining the same ends may also be used. It will be observed that where the layers I are sealed together to form the cells they form a substantially homogeneous structure permanently sealing the cells.

FIGURE 12 shows an alternative embodiment of the invention utilizing two three-ply laminates. It will be observed in each of the laminates that the impervious material I is enclosed between outer layers of the base material.

FIGURES 13 and 14 show alternate structures involving the utilization of two-ply and three-ply laminates.

In the illustration of the products in FIGURES 11 through 14, the thicknesses of the layers have been emphasized for purposes of clarity, it being understood that the layers of base material may be of the order of one to two mils in thickness, while the coating of impervious material may be of the order of one-tenth of the thickness of the base material and the cells may be of any desirable size and configuration.

While only certain embodiments of the invention have been illustrated and described, it is evident that alterations, changes and modifications may be made without departing from the true scope and spirit thereof.

What is claimed is:

1. The method of making a cellular material having a plurality of sealed cells comprising the steps of coating first and second plastic sheets having thermoplastic properties with a liquid containing a plastic having gas impervious thermoplastic properties, indvdually supportng each coated sheet while maintaining the uncoated side at a temperature below the melting point thereof, directing a multiplicity of streams of high temperature high velocity air onto said coatings throughout an appreciable portion of its travel to heat said coatings and effect evaporation of said liquid, feeding one of said coated sheets onto a movable vacuum embossing surface with the coated side facing outwardly to form a plurality of discrete depressions therein, said one coated sheet being at a temperature above the embossing temperature of the sheet and with at least the surface of the coating in the vicinity of its melting point, feeding said second sheet with at least the surface of said coating at a temperature in the vicinity of its melting point into pressure engagement with said embossed first sheet while the latter is on said embossing surface to seal said coatings one to the other and then cooling the resultant material to form the completed product.

2. The method according to claim 1 wherein said impervious plastic coatings include polyvinylidene chloride.

3. The method according to claim 2 wherein said heated coatings are rapidly cooled to transform them into amorphous states prior to feeding the coating on said second sheet into pressure contact with said first embossed sheet.

4. The method according to claim 1 including the step of precoating said sheets with a primer selected from the group consisting of epoxy resins and resins containing butadiene.

5. The method of making a cellular material having a plurality of sealed cells comprising the steps of coating two plastic sheets having thermoplastic properties with a liquid containing a plastic having thermoplastic properties that is substantially impervious to gas, supporting said sheets while heating at least the coatings thereon by a multiplicity of streams of high temperature high velocity air over an appreciable distance of travel to evaporate the liquid and form dry plastic layers, sealing said coatings one to the other to form a first laminate, coating a third plastic sheet having thermoplastic properties with a liquid containing a plastic having thermoplastic propertes that s substantially impervious to gas, heating at least the coating to evaporate the liquid and produce a dry plastic layer constituting a second laminate, heating one of said laminates and forming discrete embossments therein, heating said second laminate and while in the heated condition bringing it into contact with the embossed laminate to permanently seal said embossments and then cooling the resultant material to form the completed product.

6. The method according to claim 5 wherein said first laminate is embossed and the sheet side of said second laminate is sealed to the first said laminate.

7. The method according to claim 5 wherein said second laminate is embossed with the coated side facing the embossing surface and said first laminate is sealed to the embossed laminate.

8. The method according to claim 6 wherein a fourth sheet of plastic having thermoplastic properties is coated with a liquid containing a plastic substantially impervous to gas and having thermoplastic properties, drying said coating to form a plastic layer, and then sealing said fourth coated sheet to the coated side of said second laminate prior to sealing said second laminate to said first laminate.

References Cited

UNITED STATES PATENTS

| 2,737,467 | 3/1956 | Massey | 156—292 X |
| 2,877,151 | 3/1959 | Doherty et al. | 156—209 X |
| 3,020,194 | 2/1962 | Jerothe | 156—498 X |
| 3,124,476 | 3/1964 | Park et al. | 118—642 X |
| 3,208,898 | 9/1965 | Chavannes et al. | 156—553 X |
| 3,416,984 | 12/1968 | Chavannes et al. | 156—209 |

FOREIGN PATENTS 820,375  9/1959  Great Britain.

JOHN T. GOOLKASIAN, Primary Examiner

J. C. GIL, Assistant Examiner

U.S. Cl. X.R.

156—205, 210, 220, 292; 161—122, 254